United States Patent Office 3,470,963
Patented Oct. 7, 1969

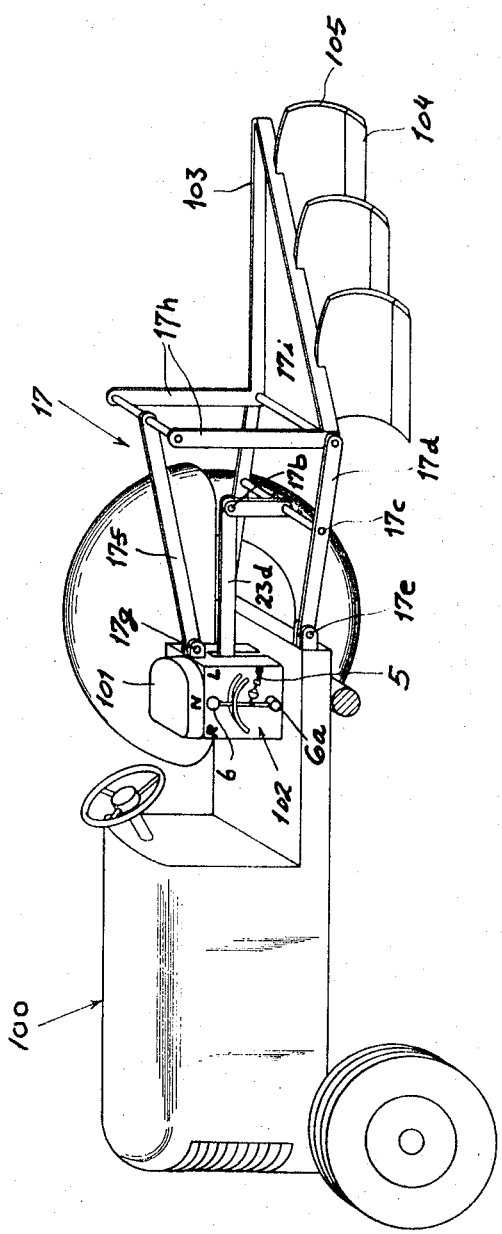

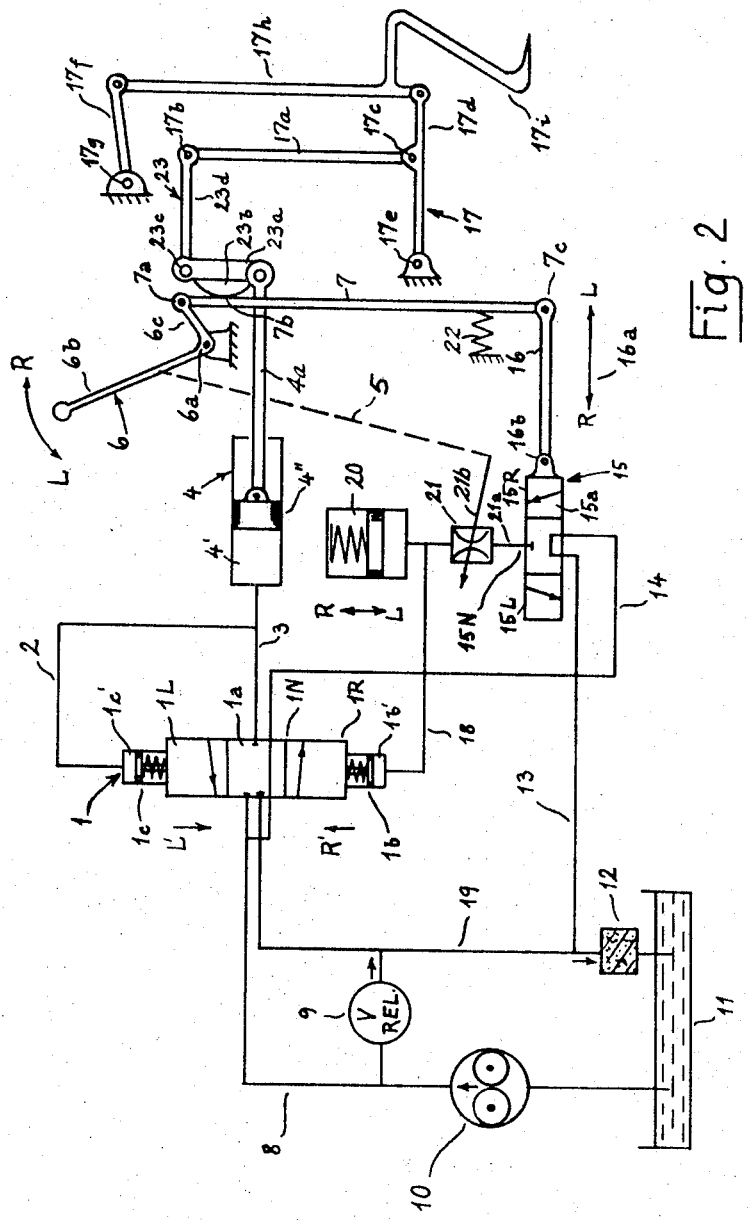

3,470,963
DEPTH-CONTROL DEVICE FOR SOIL-WORKING IMPLEMENTS
Walter Schneider, W.-Hellge-Str. 305; Joachim Reincke, Calbesche-Str. 54; Reinhard Blumenthal, Birkenweg 6; and Lothar Tschatzki, am Randel 4, all of Schonebeck, Germany; and Manfred Kagelmann, Magdeburger Chaussee 39, Olvenstedt, Germany
Filed Nov. 15, 1966, Ser. No. 594,591
Int. Cl. A01b 63/112
U.S. Cl. 172—7
9 Claims

ABSTRACT OF THE DISCLOSURE

This disclosure relates to a control system for the automatic depth regulation of a soil-working implement wherein a hydraulic power cylinder for raising and lowering the implement (e.g. a plow) is operated via a control valve which, in turn, is hydraulically operated by a pilot valve shifted in part by an actuating lever for the "raise" and "lower" movement of the implement. The system includes a hydraulic device responsive to the tractive force applied by the prime mover to the implement and, therefore, to the drag of the implement on the prime mover and provided with a throttle valve operated in accordance with the desired depth setting to regulate the effect of the pilot valve upon the principal control valve.

---

Our present invention relates to a control system for the automatic depth regulation of soil-working implements attached to a tractor or other prime mover. More particularly, this invention relates to improvements in systems of the type described and claimed in the commonly assigned copending applications Ser. Nos. 475,507 and 540,347 of July 28, 1965 and Apr. 5, 1966 and filed by one of the present joint inventors, now U.S. Patents 3,400,764 and 3,409,087.

In the first of these copending applications, it has been pointed out that depth-control devices having a manually shiftable control lever connected with a hydraulic system for raising and lowering a soil-working implement, such as a plow or a cultivator, are commonly in use in the field. Prior to the development set forth in these applications, however, automatic depth-control systems for regulating the plow depth in spite of tendencies for the plow to rise or lower upon encountering with various soil textures have had the disadvantages that they were relatively complex and more or less independent of changes in terrain. Thus, when the implement is intended to be drawn over considerable distances of difficult and variable terrain with high resistance and low resistance to forward movement alternating or developing at random, the towing-force reserve or the drawbar capacity of the tractor is exceeded and the engine or transmission of the prime mover overloaded.

In application Ser. No. 475,507, there is described a system for the automatic depth control of a soil-working implement towed by a tractor which overcomes these disadvantages by providing an actuating element shiftable by the operator of the towing vehicle and forming a lost-motion linkage engageable with a control member which, in turn, is coupled more or less flexibly with a fluid-control valve; fluid-responsive means are controlled by the valve in a servo network for raising and lowering the implement, while means is provided to control the lost motion, which represents the correction in height of the soil implement permitted in accordance with soil conditions without feedback and readjustment of the servo system. That arrangement was particularly advantageous in permitting the self-adjustment, albeit with limited control, of the depth of a plow or other implement in accordance with the soil conditions to prevent excessive strain upon the system for raising the implement and upon the drawing apparatus.

The subsequent application Ser. No. 540,347, mentioned above, is directed to an improvement in the servo systems for such depth control. Thus, the hydraulic power cylinder can be connected with the implement, in accordance with this further development, by an implement-control lever fulcrumed on the prime mover, the power cylinder being of the single-acting type. The cylinder co-operates with a first valve which controls the flow of fluid to and from the power cylinder to regulate upward and downward movement of the implement, e.g. against or with the force of gravity acting thereon; a position-responsive means is provided to co-operate with the depth-setting actuating element and includes a second valve coupled with the actuating element by a control member adapted to follow the movement of the implement and thus constituting a servo control. The control cylinder of the second valve is connected in turn to a control member of the first valve, while traction-responsive means, e.g. a tensionable rod whose tractive force is a function of the drag of the plow, is connected to the control member for shifting the valve of the power cylinder. In effect, therefore, a servo-control system including a valve and a cylinder controlled thereby is used as the feedback arrangement for operating at least in part the primary valve of the power cylinder.

Mechanical linkages of the type necessary for adequate depth control may be inconvenient or unsuitable for many agricultural purposes. Furthermore, the response time of such systems is such that it fails to adequately react to changes in the tractive force and draft of the tractor, soil texture and density or the like.

It is, therefore, the principal object of the present invention to provide an improved automatic depth-control system for soil-working implements drawn by a tractor or the like which constitutes an extension of the principles set forth in the commonly assigned copending applications mentioned above and which is relatively simple, free of operating complications and wholly responsive to the variables encountered.

A more specific object of this invention is to provide an improved automatic depth-control system which will react rapidly and without the need for mechanical sensors to changes in the position of the tractor and automatically adjust the position of the soil-working implement relatively thereto.

These objects and others which will become apparent hereinafter are attained, in accordance with the present invention, by providing a control system for the automatic regulation of the depth of a soil-working implement which includes a position-responsive pilot valve for controlling a traction-responsive main valve interposed between a source of hydraulic fluid and an implement-lifting piston-and-cylinder arrangement. We have found that the implement can respond effectively to changes in ground texture and sudden rise and fall of the tractor or implement in accordance with ground contours (in which a pitch or a wavelength of about 0.5 to 2 m. is produced by the wavy ground surface and the soil resistance changes every 10 to 30 m.) when piston means is provided to control the main valve and is biased by a secondary hydraulic network connected with the pilot valve and containing a throttle valve controlled by the actuating lever as well as a hydraulic accumulator or tractive-force gauge between this throttle valve and the piston means.

With this construction, the main-valve body is permitted to oscillate in response to changes in the tractive force representative of changing soil conditions as described in the aforementioned copending applications with the hydraulic accumulator taking up and dampening these oscillations. A rapid response of the implement without total repositioning is possible.

Furthermore, the throttle valve between the accumulator and the position-responsive control valve permits the latter to be fuly responsive to the position of the implement for the purposes of setting the system. Thus, if the throttle valve is maintained in a constricted state (small flow cross-section) after initial setting, even rapid and extreme changes in the position of the pilot-valve member following the position of the implement will not materialy effect the main valve body. On the other hand, rapid setting to extreme upper and lower positions of the implement is possible via the actuating lever, to which the throttle valve is connected by a mechanical linkage so that during setting of the implement to a predetermined depth, the large flow cross-section permits fluid to flow rapidly to and from the main valve and, consequently effects rapid raising and lowering of the implement.

These and other objects, features and advantages of the present invention will become more readily apparent from the following description, reference being made to the accompanying drawing in which:

FIG. 1 is a perspective view of a tractor provided with an installation in accordance with this invention; and FIG. 2 is a diagram of the control system thereof.

In FIG. 1, we show a tractor 100 having an actuating lever 6 in the region of the seat 101 at the post 102. The lever 6 is coupled via a Bowden cable 5 with a throttle valve of the hydraulic system, as will be described in greater detail hereinafter. The handle 6 can be set at any position to raise or lower the implement which is here shown as a plow 103 whose shares 104 are provided with moldboards 105 in the usual manner. The plow 103 is held by a drawbar linkage 17d fulcrumed at 17e to the body of the tractor 100, the remainder of the linkage 17 being described in greater detail hereinafter with reference to FIG. 2.

GENERAL DESCRIPTION OF SYSTEM

In FIG. 2 of the drawing, we show a system for controlling the plow or other implements which comprises a hydraulic control valve 1 whose valve body 1a has three positions at 1R, 1N and 1L corresponding to the "raise," "neutral" and "lower" positions of the valve body 1a. At the extremities of the valve 1, there are provided, as a piston means, control plungers 1b and 1c which are hydraulically shifted by fluid introduced into the respective compartments 1b' and 1c' as will become apparent hereafter.

The main hydraulic line 3 of the valve 1 leads to a single-acting hydraulic power cylinder 4 whose chamber 4' behind the piston 4" communicates with a hydraulic line 3. The piston 4" is pivotally attached to a connecting rod 4a articulated to one arm 23a of a bellcrank lever 23 whose fulcrum 23c to the chassis forms a hinge for the implement linkage 17. The fulcrum 23c can correspond to the usual hinge point of the hydraulic elevatable and lowerable linkage of the usual agricultural tractor (FIG. 1) as described more generally in the copending applications mentioned earlier.

The implement-positioning linkage 17 (FIGS. 1 and 2) includes a bar 17a which is pivoted at 17b to the other arm 23b of the bellcrank lever 23 and, at its extremity 17c, to a bar 17d. The latter is swingable in the vertical plane about a fulcrum 17e and forms a trapezoidal linkage with a further bar 17f which is likewise swingable in the vertical plane about its pivot 17g. A connecting bar 17h is pivotally secured to the bars 17d and 17f and carries the plow which is represented at 17i (FIG. 2). The weight of this plow acts downwardly upon the linkage 17 as represented by the arrow G.

The remainder of the primary hydraulic circuit includes a pump 10 which is driven by the engine of the prime mover and may be a source of hydraulic fluid under pressure common to a plurality of hydraulic circuits; the pump draws fluid from a reservoir 11 and supplies the medium to the principal inlet line 8 of the main circuit. The return line 19 from the valve 1 returns the hydraulic medium via a filter 12 to the reservoir 11. A pressure relief valve 9 forms a safety bypass for hydraulic fluid upon the pressure in line 8 exceeding a predetermined value, to bleed the excess pressure into inlet 19 and reservoir 11.

The secondary hydraulic circuit or control network includes a line 14 withdrawing hydraulic fluid from the main line 8 and delivering it to a pilot valve 15 whose valve body 15a is shiftable by a setting or actuating lever 6. This lever, which may be of the type described in application Ser. No. 475,407, and have means for setting the limiting raised and lower positions, is pivoted at a fulcrum 6a to the chassis or body of the tractor 100 and has an arm 6b manually shiftable in the clockwise sense to raise the implement (arrow R) or in the counterclockwise sense (arrow L) to lower it. The other arm 6c of lever 6 is connected via a force-transmitting lever 7 to the connecting rod 16.

The force-transmitting lever 7 is thus pivoted at 7a to the arm 16 and bears at a floating fulcrum 7b upon a sectoral cam 23b of the lever 23. The working arm of lever 7a is pivotably connected at 7c to the rod 16 which is shiftable in the direction of arrow 16a linearly between its raised position R and lower position L. A spring 22, seated against the fulcrum body, urges the lever 7 against its fulcrum 23b and retains the working arm of the lever in its extreme right-hand position as determined by the setting of lever 6. The rod 16 is hinged at 16b and the pilot-valve member 15a, which has sections 15R, 15N and 15L representing the "raise," "neutral" and "lower" positions of this pilot valve.

The control network filter includes a return line 13 for conducting hydraulic fluid back to the reservoir 11 and a line 21a for supplying hydraulic fluid to, and leading it from, an adjustable-aperture throttle valve 21 whose control element, represented by arrow 21b, is tied by a linkage 5 (e.g. the Bowden cable of FIG. 1) to the actuating member 6.

OPERATION

(a) "Neutral" setting

When the lever 6 is in its "neutral" or intermediate position as illustrated in FIG. 2, the central section 15N of the valve body 15a of the pilot valve 15 diverts hydraulic fluid from the line 14 to the reservoir 11 via the return line 13. Simultaneously, hydraulic line 21a leading to and from the hydraulic accumulator and traction gauge 20, and to the piston arrangement 1a, 1b of the traction-responsive valve 1 is blocked. Thus the valve body 1a remains in the position illustrated with its central section 1N preventing flow of hydraulic fluid to or from the line 3 and the lifting cylinder 4, and further blocking the lines 8 and 19. Excess hydraulic fluid (i.e. the quantity which cannot flow through the pilot valve 15) is bypassed via the pressure-relief valve 9 to the reservoir 11. The hydraulic cylinder-and-piston arrangement 4 remains unactuated and in its neutral position as illustrated. The nonexpansibility of the fluid within the cylinder 4' retains the plow or implement 17i generally at its previous setting.

(b) "Raise" position

When the depth-setting lever 6b is shifted in the clockwise direction to raise the implement, the force-transmitting lever 7 rolls upon the cam 23b as a fulcrum 7b and shifts the connecting rod 16 to the left ("raise" direction of arrow 16a), the valve member 15a of the pilot valve 15 is correspondingly shifted to the left. In this position, the valve section 15R blocks return flow to the line 13 while directing the hydraulic fluid under pressure, from line 14, to the conduit 21a, the throttle valve 21, the line 18 and the piston-and-cylinder arrangement 1b, 1b'. Inasmuch as the throttle valve 21 is coupled with the depth-setting lever 6b, the movement of this lever increases the flow cross-section in dependence upon the proximity of the lever 6b to its limiting position. When the lever 6b is moved to its limiting "raise" position, therefore, the valve 21 is throttled to a lesser extent than upon movement of the lever to a greater extent. The hydraulic fluid at 1b, 1b' shifts the valve body 1a of the main control valve upwardly (arrow R') against the lesser hydraulic force at 1c, 1c'. The valve section 1R then controls the system, to permit hydraulic fluid to flow under pressure in the primary circuit from pump 10 and line 8, through the valve 1 to the line 3 and the main cylinder 4' simultaneously, fluid flow to line 14 is cut off as is any return flow to line 19. Upon the initial setting of the valve section 15R in its "raise" position, the hydraulic accumulator 20 is charged against its resilient means (e.g. spring or gas chamber) so that even upon blockage of line 14, the hydraulic pressure in line 18 suffices to bias the valve body 1a into its "raise" position.

The flow of fluid to cylinder 4' drives the piston 4'' to the right and swings the lever 23 in a counterclockwise sense about its fulcrum 23c, thereby lifting the linkage 17 and the implement 17'. The cam 23b follows the rising movement of linkage 17 and the implement and permits the force-transmitting lever 17 to swing in a counterclockwise sense under the action of spring 22, about its pivot 7a until the neutral section 15N of the valve member 15a blocks further flow of fluid to and from lines 21a and 14. In the "neutral" position of the pilot valve 15, hydraulic pressure buildup continues in cylinder 4' and is fed back via line 2 to the piston-and-cylinder arrangement 1c, 1c' acting counter to the arrangement 1b, 1b'. The pressure buildup continues until the pressure within chamber 1c' suffices to shift the valve body 1a downwardly (FIG. 2) to block further flow from line 8 to line 3 and reconnect line 14 in the hydraulic flow path.

(c) "Lower" position

When the lever 6 is rotated in the counterclockwise sense toward its "lower" position L about fulcrum 6a, the force-transmitting lever 7 rolls upon the fulcrum 23a and, under the action of spring 22, draws the valve body 15a to the right (lower direction, arrow 16a). The section 15L of the valve body 15a permits the control network 18, 21 to be drained to the return line 13 and at a rate determined by the setting of the throttle valve 21 (and thus the degree of movement of the lever 6) into an extreme "lower" position; line 14 is blocked. The draining of cylinder 1b' applies a pressure differential to the valve body 1a, to which hydraulic pressure at full level is delivered at 1c, 1c', whereby the valve body 1a is shifted in the direction of arrow L'. The valve section 1L then permits the draining of fluid from line 3 to the return line 19 and the reservoir 11. The reduction in fluid pressure in cylinder 4' permits the piston 4'' to move to the left as the lever 23 swings in a clockwise sense about the fulcrum 23c under the weight G of the implement 17i and any downward pressures acting thereon. The downward movement of the implement continues until the cam 23a shifts the lever 7 in the clockwise sense (about its pivot 7a) until the valve body 15a is returned toward a neutral position. Further draining of line 18 and cylinder 1b' is prevented although the expressed fluid from cylinder 1b' can be received in the accumulator 20. The valve body 1a is shifted by the resulting buildup of pressure accumulator 20 and line 18 (concurrently with the reduction in pressure in the primary network 2, 3, 4) in the direction of arrow R' and into its neutral position. Again, motion of the implement 17i is terminated at the new setting.

(d) Automatic compensation

In the foregoing paragraphs we have described the depth-setting operation of our system, it being noted that, in the extreme settings of lever or handle 6, the throttle valve 21 is open to a greater extent than at intermediate positions and rapid changes in the position of the implement can be effected. Once the implement is set at any position, however, it responds automatically to changes in the drag or tractive force which in turn is a function of the texture of the soil or the contours of the terrain. Thus, a denser soil will apply a greater drag causing the implement 17i to ride upwardly and the lever 23 to rotate in a counterclockwise sense. A force is applied to the piston 4'' to urge it to the right and reduce the pressure in cylinder 4'. The corresponding pressure reduction in the feedback line 2 permits the hydraulic accumulator 20 to bias the valve body 1a in the direction of arrow $R_2$ via the piston means 1b, 1c to shift the traction-responsive valve 1 into its "raise" position and thereby supply hydraulic fluid to the cylinder 4' and elevate the implement until the desired tractive force is re-established.

Conversely, a reduction in the density of the soil tends to permit the implement to pass through it more readily and thus reduces the tractive force. The implement tends to swing in a clockwise sense about the fulcrum 23c and increase the pressure in cylinder 4'. The increasing pressure develops at line 2 as well and piston 1c displaces the valve body 1a so that fluid is drained from the cylinder 4', and the implement repositioned at a lower lever to re-establish the original tractive force.

When the tractor and implement encounter rapid changes in ground contour and suddenly raise or fall, the corresponding increases and decreases in pressure within cylinder 4' are transmitted to the valve member 1a are indicated by the position of the piston of accumulator 20 which rises and falls in the same manner. In effect, this accumulator permits rapid oscillation of the valve body 1a with correspondingly rapid readjustment of the position of the implement and, finally, with equalization and tempering of the up and down movement of the implement and the valve body. It will be observed that, inasmuch as the throttle valve 21 may be considered as constricted in the setting of lever 6b, the movements of the force-transmitting lever 7 in following the implement movements at cam 23b have little, if any, effect on the resetting of the system. Thus even if the valve body 15a oscillates between its "raise" and "lower" positions, the flow cross-section at throttle valve 21 prevents excessive influence of the position-setting means 6, 7, 15 and 16 upon the valve 1.

We claim:
1. In a control system for the automatic regulation of the depth of a soil-working implement drawn by a tractor and encountering changes in soil resistance, said control system including a hydraulic piston-and-cylinder arrangement connected with said implement for raising and lowering same relative to the tractor, a primary hydraulic network including a source of hydraulic fluid, a main control valve between said source and said arrangement for controlling hydraulic fluid flow to and from the latter, and an actuating lever on said tractor for setting the depth of said implement, the improvement which comprises:
   a pilot valve operatively connected with said lever and responsive to the position of said implement;
   means forming a secondary hydraulic network connected with said pilot valve for actuating said main valve in dependence upon the operative condition of said pilot valve;
   means responsive to the tractive force applied by said tractor to said implement and acting upon said main valve for controlling same in dependence upon said tractive force; and
   means interposed between said pilot valve and the main valve and responsive to the position of said lever for controlling the influence of said pilot valve upon said main valve in accordance with the setting of said lever,
   said main control valve being provided with a valve body having three positions corresponding to a "lower" position, a "neutral" position and a "raise" position of the implement, a piston means for selective hydraulic shifting of said valve body between said "neutral" position and said "raise" and "lower" positions, and restoring means for returning said valve body to said "neutral" position upon removal of a hydraulic bias from said body;

said means responsive to said tractive force including a hydraulic line communicating with said piston-and-cylinder arrangement for sensing pressure variations therein induced by changes in said tractive force and applying a hydraulic bias to said piston means to urge said body in one direction from its "neutral" position; and said means forming said secondary hydraulic network including a conduit communicating with said pilot valve for applying hydraulic bias to said piston means in the opposite direction.

2. The improvement defined in claim 1 wherein said means interposed between said pilot valve and said main valve includes a throttle valve in said conduit, and a mechanical linkage coupling said throttle valve with said actuating lever for increasing the flow cross-section in said conduit in an extreme setting of the lever but reducing said cross-section in an intermediate setting of said lever.

3. The improvement defined in claim 1 wherein:

said pilot valve is provided with a valve member having three positions including a "lower" position, a "neutral" position and a "raise" position; and said system further comprises a force-transmitting lever interconnecting said actuating lever and said valve member and means shiftable with said implement and bearing upon said force-transmitting lever for restoring said member to its "neutral" position upon its movement therefrom into another of its positions and corresponding movement of said implement.

4. The improvement defined in claim 3 wherein:

said main valve is provided with a passage communicating between said source and said pilot valve in said "neutral" position of said valve body;

said pilot valve is provided with a passage communicating between said passage of said main valve and a return line of said primary hydraulic network in the "neutral" position of said valve member; and said pilot valve is so constructed and arranged as to apply hydraulic bias to said valve body in said "raise" position of said valve member.

5. The improvement defined in claim 1 further comprising hydraulically operable tractive-force gauging means connected in said secondary hydraulic network and responsive to said tractive force.

6. The improvement defined in claim 5 wherein said hydraulically operable tractive-force gauging means includes a hydraulic accumulator loadable by the hydraulic pressure in said second hydraulic network.

7. The improvement defined in claim 6 wherein said hydraulic accumulator communicates with said conduit between said piston means and said means for controlling the influence of said pilot valve upon said main valve.

8. The improvement defined in claim 7 wherein said means interposed between said pilot valve and said main valve includes a throttle valve in said conduit between said hydraulic accumulator and said pilot valve, said throttle valve having a mechanical linkage coupling it with said lever for increasing the flow cross-section in said conduit in extreme settings of said lever, but reducing said cross-section in intermediate settings of said lever.

9. The improvement defined in claim 8 wherein said soil-working implement is mounted on said tractor by a swingable lever provided with a cam, said control system further including:

a force-transmitting lever interconnecting said actuating lever and said valve member; and spring means urging said force-transmitting lever against said cam whereby said force-transmitting lever controls the position of said valve member in accordance with the position of said implement.

References Cited

UNITED STATES PATENTS 2,888,805   6/1959   Czarnocki.

FOREIGN PATENTS 952,170   3/1964   Great Britain.

ANTONIO F. GUIDA, Primary Examiner

STEPHEN C. PELLEGRINO, Assistant Examiner